Feb. 18, 1930. V. L. SODERBERG 1,747,685
COMBINED ELECTRODE AND HOLDER
Filed June 3, 1927 2 Sheets-Sheet 1

Inventor:
Victor L. Soderberg,
By Wm. F. Freudenreich
Atty.

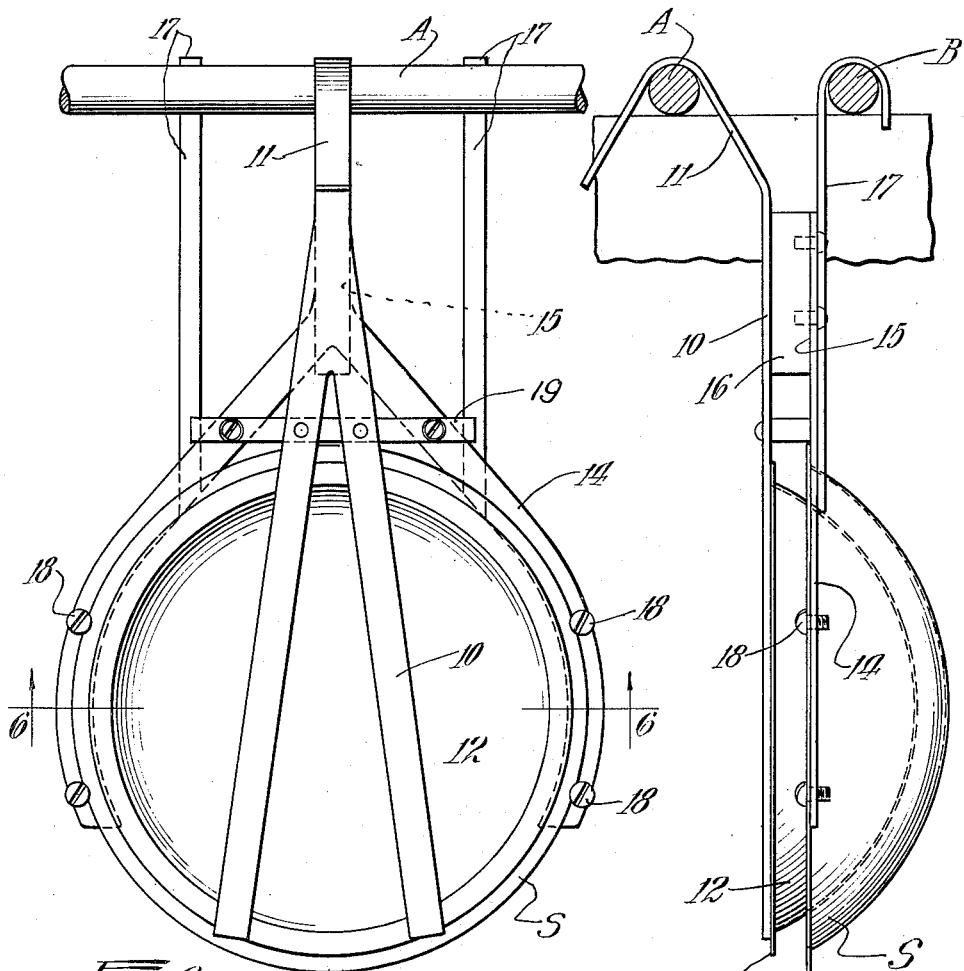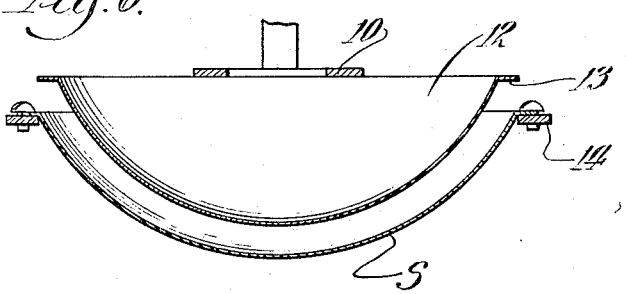

Patented Feb. 18, 1930

1,747,685

UNITED STATES PATENT OFFICE

VICTOR L. SODERBERG, OF DETROIT, MICHIGAN

COMBINED ELECTRODE AND HOLDER

Application filed June 3, 1927. Serial No. 196,391.

The present invention relates to the art of electro-deposition of metals on surfaces, and has for its object to simplify the method of handling the work and insure uniform distribution of and uniform quality throughout the layer of deposited metal.

In carrying out my invention, I provide a simple combined holder and anode, to which holder the work may readily be attached, the whole being then suspended in the electrolyte from the anode and cathode bus bars of an electro-deposition apparatus. Therefore, considering one of its aspects, the present invention may be said to have for its object to produce a simple and novel combined work holder and anode for use in the electro-deposition of metals.

Figure 1:
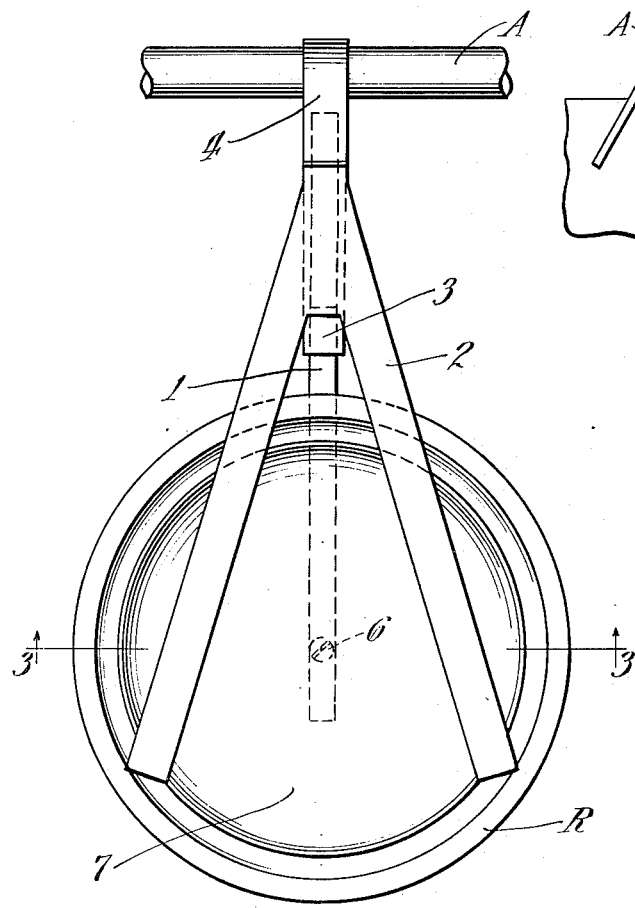
Figure 2:
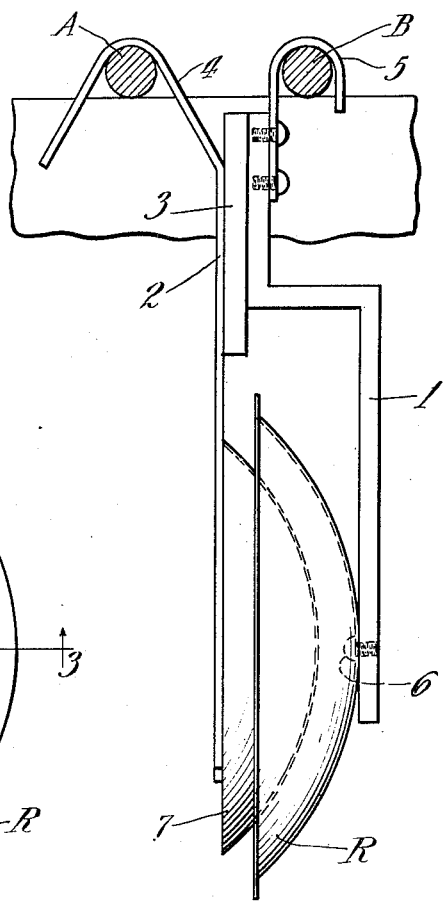
Figure 3:
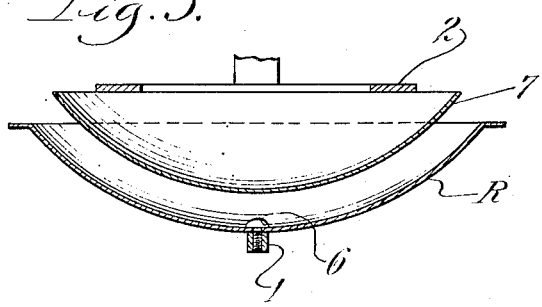

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a front elevation of one of my improved combination holder and anode, a fragment of a supporting bus bar being shown; Fig. 2 is a side view, both a cathode and an anode bus bar being shown in section; Fig. 3 is a section on line 3—3 of Fig. 1; Figs. 4 and 5 are views similar to Figs. 1 and 2, respectively, showing a modification; and Fig. 6 is a section taken approximately on line 6—6 of Fig. 4.

Referring to Figs. 1 to 3 of the drawings, 1 represents a heavy Z bar to one arm of which is secured a bar 2 in the form of an inverted Y, a block 3 of insulating material being arranged between the base of the fork of the member 2 and the bar 1, so that the fork lies in a plane parallel with the free arm of the member 1. The stem part of the member 2 is extended beyond the insulating block and is bent into the form of a hook 4. The upper end of the bar 1 is also provided with a metal hook, as indicated at 5. The hooks are so located that when they are engaged over an anode bus bar A and a cathode bus bar B respectively, the main portions of the members 1 and 2 hang vertically from such bars.

The work is adapted to be detachably secured on the lower end of the bar 1, so as to lie in the space between the same and the member 2; whereas the member 2 has fixed thereon an anode extending into this same space and being of such a size and shape that all points in the surface to receive a deposit of metal are spaced equally from the anode, assuming that a uniform distribution of the deposited metal is to be secured. In the arrangement shown, the work to be electroplated is a concave reflector R provided with a small central opening. Therefore the work may be secured to the bar 1 by means of a small screw 6 extending through the central opening in the reflector. The anode is in the form of a dish 7 lying on the inner side of and secured to the member 1, the convex side of the anode facing the bar 1. The curvature of the anode is such that the shortest distance between any point on the surface to be plated and the anode is substantially the same as the corresponding distance between the anode and any other point in said surface.

When a reflector is to be electroplated, it is simply fastened to the holder which is then hung in the electrolyte from the bus bars, no further attention or adjustment being required to insure the proper deposition of metal on the reflector, as long as the proper current is supplied for the proper length of time. Consequently, after the holder and anode have once been prepared, any unskilled person can attach the reflectors so that perfect results will be obtained.

The arrangement shown in Figs. 4 to 6 is substantially the same as that heretofore described, being modified to permit the securing of a piece of work, such as a reflector, at the edges instead of at the center.

The member 10, with its hook 11, may be substantially the same as the member 2 and the hook 4 heretofore described. The anode 12 may be similar to the anode 7, although I have shown it as being provided with a flange 13 corresponding to the flange on the reflector S.

Instead of the Z bar in the first form, I provide a second fork member 14 provided with a stem 15 between which and the stem of the member 10 is an insulating block 16 to which both the members 10 and 14 are secured. The fork 14 has secured thereto, one on each side of the stem, a hook 17 corresponding to the hook 5. The free ends of the arms of the fork 14 are in the form of arcs of a circle having a common center, the largest radius being somewhat greater than the largest radius of the reflector flange. Thus the reflector may be laid within the fork 14 with its flange resting on the curved arms and be secured in place by means of a few screws or clamps 18 arranged on these arms in position partially to overlie the flange of the reflector and thus clamp the flange to the fork 14 when the screws are screwed in. In addition to the spacing block 16, between the stems of the forks, there may be a second spacing and bracing bar 19 of insulating material, disposed between the forks themselves. Wherever insulating material is used in either form of my invention, it is preferably of a material that is not affected by chromium plating solutions.

Consequently the work may be fixed in proper relation to the anode as quickly and as easily as in the first form, and the work and the holder be hung in the electrolyte without requiring further attention and with the certainty that a perfect deposition of metal will be made on the work if the other elements forming part of the electro-deposition apparatus used in the process are of the proper character.

My improved holder and electrode may, of course, take any one of a large variety of forms as long as it permits the work to be quickly and easily inserted thereon in proper relation to an anode. Therefore, while I have illustrated and described with particularity, only a single preferred form of holder and anode, with a slight modification, I do not wish to be limited to the particular details thus illustrated and described, or to any particular process, excepting as pointed out in the definitions of my invention constituting the appended claims.

I claim:

1. A combined holder and anode, comprising two metal supporting elements, an insulating block arranged between and secured to said elements at one end thereof, an anode fixed to the free end of one of said elements in the space between said elements, and means associated with the other element to hold a piece of work in said space in fixed relation to said anode.

2. A combined holder and anode comprising a Y shaped metal member, the free end of the stem of said member being bent into the form of a hook, a work supporting element secured to but insulated from said stem and extending past but in spaced relation to the fork portion of said member, means associated with said work supporting element for securing an article in the space between the same and said fork, and an anode secured to said fork within said space and in operative relation to an article secured in place as aforesaid.

In testimony whereof, I sign this specification.

VICTOR L. SODERBERG.